United States Patent [19]

Orikasa et al.

[11] Patent Number: 5,438,098
[45] Date of Patent: Aug. 1, 1995

[54] THERMOPLASTIC RESIN COMPOSITION

[75] Inventors: Yuichi Orikasa, Yokohama; Suehiro Sakazume, Fujisawa, both of Japan

[73] Assignees: Nippon Petrochemicals Co., Ltd.; Nippon Oil & Fats Co., Ltd., both of Tokyo, Japan

[21] Appl. No.: 189,517

[22] Filed: Jan. 31, 1994

Related U.S. Application Data

[62] Division of Ser. No. 857,472, Mar. 25, 1992, Pat. No. 5,296,538.

[30] Foreign Application Priority Data

Mar. 25, 1991 [JP] Japan .................................. 3-83044

[51] Int. Cl.$^6$ ...................... C08G 63/48; C08G 63/91
[52] U.S. Cl. ...................................... 525/63; 525/64; 525/189
[58] Field of Search ................... 525/63, 64, 189, 537

[56] References Cited

U.S. PATENT DOCUMENTS

| | | | |
|---|---|---|---|
| Re. 31,406 | 10/1983 | Gaylord | 526/279 |
| 3,189,662 | 6/1965 | Vaughn, Jr. | 260/824 |
| 3,419,634 | 12/1968 | Vaughn, Jr. | 260/824 |
| 3,419,635 | 12/1968 | Vaughn, Jr. | 260/824 |
| 3,808,179 | 4/1974 | Gaylord | 260/86.1 |
| 3,850,892 | 11/1974 | Shen et al. | 260/80.72 |
| 3,994,988 | 11/1976 | Laurin | 260/824 |
| 4,120,570 | 10/1978 | Gaylord | 351/40 |
| 4,478,981 | 10/1984 | Arkles | 525/92 |
| 4,536,554 | 8/1985 | Lim et al. | 526/264 |
| 4,550,139 | 10/1985 | Arkles | 525/90 |
| 4,962,148 | 10/1990 | Orikasa et al. | 525/64 |
| 4,987,165 | 1/1991 | Orikasa et al. | 525/189 |
| 5,204,405 | 4/1993 | Orikasa et al. | 525/64 |
| 5,244,473 | 9/1993 | Sakazume et al. | 525/66 |
| 5,248,730 | 9/1993 | Yamao | 525/122 |

FOREIGN PATENT DOCUMENTS 2185653 4/1974 France .
2324654 11/1973 Germany .

OTHER PUBLICATIONS

Arkles, "Look What You Can Make Out of Silicones"; Chem. Tech., 13, pp. 542–555 (12983).
Noshay, et al., Block Co-Polymers, Overview and Critical Survey, Academic Press, New York (1977), p. 393 pf.
Sperling, L. M., Interpenetrating Polymer Networks and Related Materials, Plenum Press, New York (1981), Chapter 3.
Vaughn, H. A., "The Synthesis and Properties of Alternating Block Polymers of Dimethylsiloxane...", Polymer Letters, vol. 7, pp. 569–572 (1969).

(List continued on next page.)

Primary Examiner—John C. Bleutge
Assistant Examiner—Helen F. Lee
Attorney, Agent, or Firm—Ostrolenk, Faber, Gerb & Soffen

[57] ABSTRACT

There is provided a thermoplastic resin composition, the composition comprising 1 to 99% by weight of polyarylenesulfide-type resin (I), 99 to 1% by-weight of at least one resin (II) selected from the group consisting of polycarbonate-type polyphenyleneether-type resins, and ABS-type resins, and 0.1 to 100 parts by weight, on the basis of 100 parts of the aforesaid resins (I)+(II), of a graft copolymer (III) as compatibilizer having a specific multi-phase structure.

The thermoplastic resin composition containing the compatibilizer (III) of the present invention has a feature of each of the blended resins of a polyarylenesulfide-type resin (I) and at least one resin (II) selected from the group consisting of carbonate-type resins, polyphenyleneether-type resins and ABS-type resins, such as good impact and heat resistance, moldability, and appearance of molded articles. The composition is widely used for the manufacture of automobile parts, electrical and electronic components, and industrial parts, and the like.

9 Claims, No Drawings

OTHER PUBLICATIONS

LeGrand, D. G., "Mechanical and Optical Studies of Poly(dimethylsiloxane) Bisphenol-A Polycarbonate Copolymers", *Polymer Letters, vol. 7, pp. 579-585 (1969)*.

Barrie, A., et al., "Gas Transport in Heterogeneous Polymer Blends", *J. of Membrane Sci.*, 21 (1984) pp. 185-202.

*Modern Plastics Encyclopedia.*, McGraw Hill, 1984-1985, Ed., p. 452.

"Contact Lenses", vol. 2, Chpt. 13, J. Stowe and A. J. Phillips, eds., Buttersworths, Boston, (1981).

Kambour, R. P., "Structure and Properties of Alternating Block Polymers . . . ", *Block Polymers*, Aggarwal, S. L., ed., Plenum Press (1970).

Ward, III, et al., "Ultrathin Silicone/Polycarbonate Membranes for Gas Separation Processes", *J. of Membrane Sci.*, vol. 1, pp. 99-108 (1976).

Walker, B. M., *Handbook of Thermoplastic Elastomers*, pp. 263-283, New York, Van Nostrand Reinhold Co.

Fitzgerald, J. K., "Understanding Permeability and Wettability", *The Contact Lens Journal*, pp. 2-9.

Kambour, R. P., "Microdomains in Alternating Block Polymers of Dimethylsiloxane and Bishenol-A Carbonate", *Polymer Letters*, vol. 7, pp. 573-577 (1969).

Tighe, B. J., "Polymers as Contact Lens Materials: An Overview", *Chemistry and Industry*, No. 22, Nov. 21, 1981.

Tighe, B. J., "The Design of Polymers for Contact Lens Applications", *The British Polymer Journal*, pp. 72-77, Sep. 1976.

THERMOPLASTIC RESIN COMPOSITION

This is a divisional of application Ser. No. 07/857,472 filed Mar. 25, 1992.

BACKGROUND OF THE INVENTION

1. Field of the Invention

The present invention relates to a thermoplastic resin composition comprising a polyaryleuesulfide-type resin (I); at least one resin (II) selected from the group consisting of polycarbonate-type resins, polyphenyleneether-type resins and ABS-type resins; and a compatibilizer (III) for the resins (I) and (II).

The thermoplastic resin composition has good heat resistance, impact resistance, oil resistance and water. resistance. It is widely used for the manufacture of automobile parts, electrical and electronic components, industrial parts, and the like.

2. Description of the Prior Art

Polyarylenesulfide-type resins, polycarbonate-type resins, polyphenyleneether-type resins, or ABS-type resins have a good mechanical properties, heat resistance, chemical resistance, and the like. Therefore, they are widely used for the manufacture of various molded articles.

Hitherto, in order to develop a new product having a highly developed functions with a reasonable price, a number of attempts have been made to prepare a multi-functional thermoplastic resin composition having a feature of each of the blended resins.

Polyarylenesulfide-type resins are excellent in heat resistance and incombustibility, but brittle and poor in ductility.

On the other hand, polycarbonate-type resins, polyphenyleneether-type resins, and ABS-type resins have a fairly good heat and impact resistance. However, there is still a need for improvement in the heat resistance and chemical resistance.

When blending at least one resin (II) selected from the group consisting of polycarbonate-type resins, polyphenyleneether-type resins and ABS-type resins with a polyarylenesulfide-type resin (I), there is a possibility to obtain a thermoplastic resin composition having the features of the resin (II) selected from the group consisting of polycarbonate-type resins, polyphenyleneether-type resins, and ABS-type resins while the features of polyarylenesulfide-type resins (I) are retained and the drawbacks are improved.

From this point of view, attempts to provide an improved resin composition by blending a polyarylenesulfide-type resin with a polycarbonate-type resin, polyphenyleneether-type resin or ABS-type resin have been made (Japanese Provisional Publication Nos. 63-312356, 2-84462 and 63-304046). However, these attempts have not been entirely successful. In this case, the feature of each resin can not be fully exhibited because of a difference in chemical structure and poor compatibility between the two resins.

U.S. Pat. No. 4,665,131 to Moriya et al. entitled "a block copolymer", U.S. Pat. No. 4,839,423 entitled "a method for the preparation of graft copolymer resin compositions", U.S. Pat. No. 4,879,347 entitled "a graft polymerization preformer and method for preparing the same", and U.S. Pat. No. 4,923,956 entitled "a graft polymerization precursor and method for preparing the same" disclose the same graft copolymer, its preformer or precursor as in the present invention.

However, Moriya did not make any mention of or any reference to the fact that the graft copolymer is an effective compatibilizer for the blend of specific resins comprising a polyarylenesulfide-type resin and at least one resin selected from the group consisting of polycarbonate-type, polyphenyleneether-type and ABS-type resins, the specific resins being not compatible together.

Accordingly, the principal object of the present invention is to provide a thermoplastic resin composition having an excellent heat resistance, dimensional stability, moldability, impact resistance and oil resistance while effectively preventing delamination of molded articles, wherein the thermoplastic resin composition comprises a polyarylenesulfide-type resin (I); at least one resin (II) selected from the group consisting of polycarbonate-type resins, polyphenyleneether-type resins and ABS-type resins; and a compatibilizer (III) for the resins (I) and (II).

SUMMARY Of THE INVENTION

After intensive investigations of compatibilizers, the inventors have found that the intended object can be attained by providing a specific multi-phase structure thermoplastic resin (III) as compatibilizer, wherein the compatibilizer is incorporated in the polyarylenesulfide-type resin (I) along with at least one resin (II) selected from the group consisting of polycarbonate-type resins, polyphenyleneether-type resins and ABS-type resins, thereby obtaining a thermoplastic resin composition having excellent impact resistance, which is a feature of the resin (II), while the good heat resistance and incombustibility of the polyaryenesulfide-type resin (I) are retained.

According to a first aspect of the present invention, there is provided a thermoplastic resin composition comprising 1 to 99% by weight of a polyarylenesulfide-type resin (I); 1 to 99% by weight of at least one resin (II) selected from the group consisting of polycarbonate-type resins, polyphenyleneether-type resins, and ABS-type resins; and 0.1 to 100 parts by weight of a graft copolymer as compatibilizer for the resins (I) and (II) based on 100 parts by weight of the resins (I)+(II).

The compatibilizer (III) of the invention is a multi-phase structure thermoplastic resin which is a graft copolymer composed of 5 to 95% by weight of an epoxy group-containing olefin copolymer, and 95 to 5% by weight of a vinyl-type polymer or copolymer obtained from at least one monomer selected from the group consisting of aromatic vinyl monomers, acrylic acid ester monomers, methacrylic acid ester monomers, acrilonitrile and methacrylonitrile, either of the (co)-polymer components in the graft copolymer being in the form of a dispersion phase having a particle diameter of 0,001 to 10 μm.

DETAILED DESCRIPTION OF THE INVENTION

The polyarylenesulfide-type resin according to the present invention is a polymer represented by the general formula:

 (1)

[wherein Ar is a divalent aromatic residue having at least one 6-member carbon ring such as those represented by the general formulas (2) to (7), and the aromatic ring may be substituted by a substituent group such as F, Cl, Br, OH]

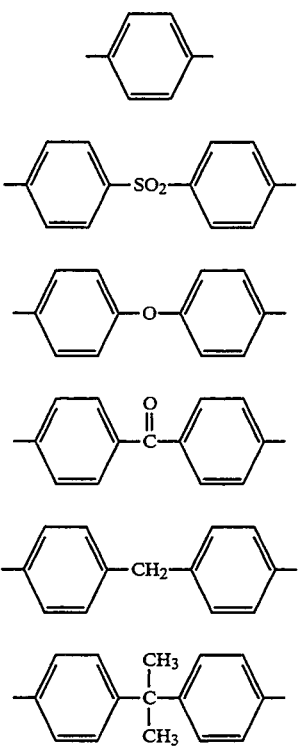

Typical examples of the polyarylenesulfide resin (hereinafter referred "PPS") include a polyphenylenesulfide-type resin represented by the general formula:

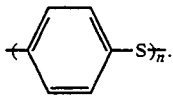

The polyarylenesulfide-type resin may be prepared by the reaction of p-dichlorobenzene with sodium sulfide in an N-methyl pyrolidone solution at 160° to 250° C. under pressure (Japanese Patent Publication No. 54-3368).

Examples of the polycarbonate-type resin according to the present invention include 4,4-dioxydiarylalkane-type polycarbonate resins typified by the polycarbonate obtained from 4,4-dihydroxydiphenyl-2,2-propane (so-called bisphenol). Particularly, polycarbonate resins from 4,4-dihydroxydiphenyl-2,2-propane having a number average molecular weight of 15,000 to 80,000 are preferred. Any synthetic method may be employed for the preparation of these polycarbonate resins. For example, the polycarbonate resin from 4,4-dihydroxydiphenyl 2,2-propane may be prepared by blowing phosgene in a solvent solution of 4,4-dihydroxydiphenyl-2,2-propane as dioxy compound in the presence of an aqueous caustic alkali, or alternatively by carrying out ester interchange between 4,4-dihydroxydiphenyl-2,2-propane and diester carbonate in the presence of a catalyst.

Examples of the polyphenyleneether-type resin according to the present invention include a polymer obtained by oxidation-polymerization of a phenolic compound represented by the general formula (9)

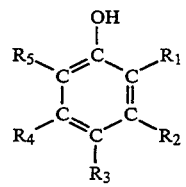

[wherein each of $R_1$, $R_2$, $R_3$, $R_4$ and $R_5$ is selected from the group consisting of a hydrogen atom, a halogen atom, a hydrocarbon group or a substituted hydrocarbon group, and at least one of them is a hydrogen atom]by use of oxygen or an oxygen-containing gas in the presence of a coupling catalyst.

Typical examples of $R_1$, $R_2$, $R_3$, $R_4$ and $R_5$ in the above general formula include hydrogen, chlorine, fluorine, bromine, iodine, methyl, ethyl, propyl, butyl, chloroethyl, hydroxyethyl, phenylethyl, benzyl, hydroxymethyl, carboxyethyl, cyanoethyl, phenyl, chlorophenyl, methylphenyl, dimethylphenyl, ethylphenyl, and the like.

Typical examples of the phenolic compounds represented by the above-described general formula include phenol; o-, m- and p-cresols; 2,6-, 2,5-, 2,4- and 3,5-dimethylphenols; 2-methyl-6-phenylphenol; 2,6-diphenylphenol; 2,6-dimethylphenol; 2-methyl-6-ethylphenol; and 2,3,5-, 2,3,6-, and 2,4,6-trimethylphenols, and mixtures thereof.

A phenolic copolymer of the phenol represented by the general formula (9) with another divalent phenol such as bisphenol A, tetrabromobisphenol A, resorcin and hydroquione may be employed.

Examples of the styrene-type resins according to the invention for mixture with the polyphenyleneether-type resin include homopolymers of styrene, α-methylstyrene, and p-methylstyrene; a high-impact polystyrene modified with a rubber-like polymer such as styrene-butadiene copolymer rubbers, ethylene-propylene copolymer rubbers; ethylene-propylene-diene terpolymer rubbers; a styrene-maleic anhydride copolymer; a styrene-acrylonitrile copolymer; a styrene-acrylonitrile-butadiene terpolymer; a styrene-methylmethacrylate copolymer; and the like. The preferred amount of the styrene-type resin is in the range from 0 to 95% by weight, based on the polyphenyleneether resin.

The ABS-type resin according to the invention is a graft copolymer (a) obtained by copolymerization of at least two monomers selected from the group consisting of vinyl cyanide compounds, vinyl aromatic compounds, and unsaturated carboxylic acid alkylester compounds in the presence of a butadiene-type rubber.

Optionally, the ABS resin may contain a copolymer (b) obtained by copolymerization of at least two monomers selected from the group consisting of vinyl cyanide compounds, aromatic vinyl compounds, and unsaturated carboxylic acid alkylester compounds. The preferred ABS resin comprises 10 to 100 parts by weight of the graft copolymer (a) and 90 to 0% by weight of the copolymer (b). When the amount of copolymer (a) is less than 10% by weight, impact resistance is not improved.

Any proportion of the conjugated diene-type rubber to the aforesaid compounds may be employed, with the preferred proportion being in the range from 5 to 70% by weight of the diene-type rubber and 95 to 30% by weight of the aforesaid compounds.

Any proportion of the compounds may be employed, with the preferred proportion being in the range from 0 to 30% by weight of a vinyl cyanide compound, 30 to 80% by weight of an aromatic vinyl compound, and 0 to 70% by weight of an unsaturated carboxylic acid alkylester.

Any particle diameter of the conjugated diene-type rubber may be employed, with the preferred particle diameter being in the range from 0.05 to 5 μm.

The aforesaid copolymer (b) is preferably composed of 0 to 30% by weight of a vinyl cyanide compound, 50 to 90% by weight of a vinyl compound, and 0 to 40% by weight of an unsaturated carboxylic acid alkylester.

Any intrinsic viscosity (30° C., DMF) of the copolymer (b) may be employed, with the viscosity within the range of from 0.25 to 1.50 being preferred.

Examples of the conjugated diene-type rubber include polybutadienes, butadiene-styrene-copolymers, butadiene-acrylonitrile copolymers, and mixtures thereof.

Any gel-content in the diene-type rubber may be used.

Examples of the vinyl cyanide compounds include acrylonitrile and methacrylonitrile.

Examples of the aromatic vinyl compounds include styrene, α-methylstyrene, vinyl toluenes, dimethylstyrenes, and chlorostyrenes.

Examples of the unsaturated acid alkylesters include methyl acrylate, ethyl acrylate, butyl acrylate, methyl methacrylate, ethyl methacrylate, butyl methacrylate, hydroxyethyl acrylate, hydroxyethyl methacrylate, and mixtures thereof.

Any method for the preparation of ABS-type resins may be employed. Examples of the method include emulsion polymerization, suspension polymerization, solution polymerization, bulk polymerization, and emulsion-suspension polymerization.

Although any resin component (II) may be employed in the present invention, polyphenyleneether and polycarbonate-type resins are preferred from a view of heat resistance. The particularly preferable ones are polyphenyleneether-type resins.

From a view of impact resistance, polycarbonate-type resins are particularly preferred, and from a view of moldability, ABS-type resins are particularly preferred.

The epoxy group-containing olefin copolymer in the compatibilizer according to the present invention is a high-pressure radical polymerization process copolymer of an olefin and an unsaturated glycidyl group-containing monomer, or a terpolymer of an olefin, an unsaturated glycidyl group-containing monomer and another unsaturated monomer, or a multi-component copolymer. The particularly preferable olefin of the copolymer is ethylene, and the preferable copolymer is composed of 60 to 99.5% by weight of ethylene, 0.5 to 40% by weight of a glycidyl group-containing monomer and 0 to 39.5% by weight of another unsaturated monomer.

Examples of the aforesaid unsaturated glycidyl group-containing monomer include glycidyl acrylate; glycidyl methacrylate; itaconic acid monoglycidyl ester; butenetricarboxylic acid monoglycidyl ester; butenetricarboxylic acid diglycidyl ester; butenetricarboxylic acid triglycidyl ester; vinyl glycidyl ethers or glycidyl esters of α-chloroallyl, maleic acid, crotonic acid and fumaric acid; allyl glycidyl ether; glycidyl oxyethylvinyl ether; glycidyl ethers such as styrene-p-glycidyl ether; and p-glycidyl styrene. The particularly preferable ones are glycidyl methacrylate and allyl glycidyl ether.

Other examples of the unsaturated monomers include at least one monomer selected from the group consisting of olefins, vinyl esters, α,β-ethylenic unsaturated carboxylic acids and their derivatives. Typical examples of such unsaturated monomers include olefins such as propylene, butene-1, hexene-1, decene-1, octene-1 and styrene; vinyl esters such as vinyl acetate, vinyl propionate and vinyl benzoate; acrylic acid, methacrylic acid, esters such as methyl, ethyl, propyl, butyl, 2-ethylhexyl, cyclohexyl, dodecyl and octadecyl acrylates or methacrylates; maleic acid and maleic acid anhydride; itaconic acid; fumaric acid; maleic monoesters and diesters; vinyl chloride; vinyl ethers such as vinyl methyl ether and vinyl ethyl ether; and acrylic acid amide compounds. Particularly, acrylic acid esters ape preferred.

Typical examples of the epoxy group-containing olefin copolymer include ethylene-glycidyl methacrylate copolymers; ethylene-vinyl acetate-glycidyl methacrylate copolymers; ethylene-ethyl acrylate-glycidyl methacrylate copolymers; ethylene-carbon monooxide-glycidyl methacrylate copolymers; ethylene-glycidyl acrylate copolymers; and ethylene-vinyl acetate-glycidyl acrylate copolymers.

Above all, ethylene-glycidyl methacrylate copolymers are particularly preferred.

These epoxy group-containing olefin copolymers can be used as a mixture thereof.

The above-described epoxy group-containing olefin copolymer may be prepared conveniently by a high-pressure radical polymerization. That is, the epoxy group-containing olefin copolymer may be prepared by simultaneously or stepwisely polymerizing a monomer mixture of 60 to 99.5% by weight of one or more unsaturated glycidyl group-containing monomers, and 0 to 39.5% by weight of at least one other ethylenic unsaturated monomer in the presence of 0.0001 to 1% by weight of a radical polymerization initiator, based on the total weight of all the monomers, at a pressure of 500 to 4,000 Kg/cm$^2$ and a temperature of 50° to 400° C., preferably 100° to 350° C., using a chain transfer agent and, if necessary, an auxiliary agent in an autoclave or tubular reactor. Examples of the above-described radical polymerization initiator include usual initiators such as peroxides, hydroperoxides, azo compounds, and oxygen.

Examples of the chain transfer agent include hydrogen, propylene, butene-1, saturated aliphatic hydrocarbons having 1 to 20 carbon atoms such as methane, ethane, propane, butane, isobutane, n-hexane, n-heptane and cycloparaffins; chloroform and carbon tetrachloride; saturated aliphatic alcohols such as methanol, ethanol, propanol and isopropanol; saturated altphatic carbonyl compounds having 1 to 20 carbon atoms or more such as carbon dioxide, acetone and methyl ethyl ketone; and aromatic compounds such as toluene, diethylbenzenes and xylenes.

Other examples of the epoxy group-containing olefin copolymer according to the present invention include modified polymers prepared by addition polymerization of the above-described unsaturated glycidyl group-containing monomer with a conventional olefin homopolymer or copolymer.

Examples of the aforesaid conventional olefin homopolymer or copolymer include homopolymers such as low-density, medium-density and high-density polyethylenes, polypropylenes, polybutene-1 and poly-4-methylpentene-1; and ethylene-α-olefin copolymers such as ethylene-propylene copolymers, ethylene-butene-1 copolymers, ethylene-hexene-1 copolymers, ethylene-4-methylpentene-1 copolymers, ethylene-octene-1 copolymers, propylene-α-olefin-copolymers such as propylene-ethylene block copolymers; ethylene-vinyl acetate copolymers; ethylene-acrylic acid copolymers; ethylene-methacrylic acid copolymers; copolymers of ethylene with methyl, ethyl, propyl, isopropyl or butyl acrylate or methacrylate; ethylene-maleic acid copolymers; ethylene-propylene copolymer rubbers; ethylene-propylene-dienecopolymer rubbers; liquid polybutadienes; ethylene-vinyl acetate-vinyl chloride copolymers; and mixtures thereof.

Typical examples of the vinyl-type polymer or copolymer in the compatibilizer according to the invention include polymers or copolymers prepared by polymerization of one or more of vinyl monomers such as aromatic vinyl monomers, for example, styrene, nucleus-substituted styrenes such as methylstyrenes, dimethylstyrenes, ethylstyrenes, isopropylstyrenes and chlorostyrenes, and α-substituted styrenes such as α-methylstyrene and α-ethylstyrene; acrylate and methacrylate monomers, for example, alkylesters having 1 to 7 carbon atoms of acrylic acid or methacrylic acid such as methyl, ethyl, propyl, isopropyl and butyl acrylate and methacrylate; acrylonitrile and methacrylonitrile monomers; vinyl ester monomers such as vinyl acetate and vinyl propionate; acrylamide and methacrylamide monomers; and monoesters and diesters of maleic acid anhydride or maleic acid. Above all, aromatic vinyl monomers, acrylic or methacrylic monomers, and acrylonotrile or methacrylonitrile monomers are preferred.

The vinyl-type polymer or copolymer obtained from an aromatic vinyl monomer is particularly preferred because the vinyl polymer or copolymer can be easily dispersed in at least one resin (II) selected from the group consisting of polyphenyleneether-type resins, polycarbonate-type resins and ABS-type resins.

The multi-phase structure thermoplastic resin as compatibilizer according to the present invention is an epoxy group-containing olefin copolymer matrix or a vinyl-type polymer or copolymer matrix in which another vinyl-type polymer or copolymer, or epoxy group-containing olefin or copolymer is uniformly dispersed in a spherical form.

The polymer dispersed in the matrix has a particle diameter within the range of 0,001 to 10 μm, preferably 0.01 to 5 μm. When the particle diameter of the dispersed polymer is less than 0.001 or more than 10 μm, compatibility of the polyarylenesulfide-type resin with the polycarbonate-type resin is poor with the result that, for example, the appearance of molded articles deteriorates or impact resistance of the resulting resin composition can not be improved sufficiently.

The vinyl-type polymer or copolymer in the compatibilizer according to the present invention has a number average polymerization degree within the range of 5 to 10,000, preferably 10 to 5,000. When the number average polymerization degree is less than 5, compatibility with the aforesaid resin (II) is poor and heat resistance of the resulting composition is lowered, although impact resistance of the composition is improved. When it is in excess of 10,000, melting viscosity of the compatibilizer is high, moldability of the resulting resin composition deteriorates, and surface luster of molded articles falls off.

The compatibilizer according to the invention is composed of 5 to 95% by weight, preferably 30 to 90% by weight of the epoxy group-containing olefin copolymer. Therefore, the content of the vinyl-type polymer or copolymer is 95 to 5% by weight, preferably 70 to 10% by weight.

When the content of the epoxy group-containing olefin copolymer is less than 5% by weight, compatibility with the aforesaid resin (I) is poor, and its improvement effect on impact resistance of the resulting thermoplastic resin composition is not exerted sufficiently; and inversely when it is in excess of 95% by weight, compatibility with the aforesaid resin (II) is poor, and heat resistance of the resulting resin composition *is lowered, although impact resistance of the composition is sufficiently improved.

Further, when the amount of vinyl-type polymer or copolymer is in a range of 70 to 10% by weight, the vinyl polymer or copolymer can be easily dispersed in the epoxy group-containing olefin copolymer resulting in an improved reactivity between the polyarylenesulfide-type resin and the epoxy group-containing olefin copolymer preferably.

The continuous phase of epoxy group-containing olefin copolymer is no longer distinguishable from the dispersed phase of vinyl-type (co)polymer beyond the critical range of 30% by weight of the epoxy group-containing olefin copolymer and 70% by weight of the vinyl-type (co)polymer. Which resin will be the dispersed phase depends on the density (the higher the easier), the polarity (the more the easier) and the viscosity (the higher the easier) of each resin, as well as the proportion of epoxy group-containing copolymer to vinyl-type (co)polymer.

Therefore, the phase transition point deviates from 50/50 to 30/70 of the composition ratio of epoxy group-containing olefin copolymer to vinyl-type (co)polymer.

The amount of compatibilizer according to the invention is 0.1 to 100 parts by weight, based on 100 parts by weight of aforesaid resins (I)+(II), preferably 0.5 to 70, more preferably 1 to 50 parts by weight.

When the amount of compatibilizer is less than 0.1 parts by weight, compatibility of the resin (I) with resin (II) is not improved sufficiently with the result that delamination of molded articles occurs and a sufficient impact strength is not obtained. Inversely, when it is in excess of 100 parts by weight, mechanical properties and heat resistance deteriorate.

As for the grafting technique used to prepare the compatibilizer according to the invention, there may be employed a well known process such as a chain transfer process and an ionizing radiation process, but the following process is most conveniently employed, because grafting efficiency is high, secondary cohesion due to heat does not occur, and therefore performance can be exerted effectively.

Now, a method for preparing thermoplastic resin compositions using the compatibilizer according to the invention will be described in detail.

Water is suspended in 100 parts by weight of an epoxy group-containing olefin copolymer. Afterward, 5 to 400 parts by weight of at least one vinyl monomer is added to the suspension, and to the mixture is added, a solution in which there are dissolved 0.1 to 10 parts by weight, based on 100 parts by weight of the vinyl monomer, of one or more of radical polymerizable or copolymerizable organic peroxides represented by the under-described general formula (10) or (11) and 0.01 to 5 parts by weight, based on 100 parts by weight of the total of the vinyl monomer and the radical polymerizable or copolymerizable organic peroxide, of a radical polymerization initiator having a decomposition temperature, to obtain a half-life period within the range of 10 hours, of from 40° to 90° C. The mixture is then heated under conditions that the decomposition of the radical polymerization initiator does not occur substantially, in order to impregnate the vinyl monomer, the radical polymerizable or copolymerizable organic peroxide and the radical polymerization initiator in to the epoxy group-containing olefin copolymer. When the impregnation ratio has reached 50% by weight or more of the original total weight of the vinyl monomer, peroxide and initiator, the temperature of this aqueous suspension is raised to copolymerize the vinyl monomer with the radical polymerizable or copolymerizable organic peroxide in the epoxy group-containing olefin copolymer, thereby obtaining a graft copolymer precursor.

This graft copolymer precursor also is a compatibilizer according to the present invention. Therefore, the thus obtained graft copolymer precursor may be directly melted and mixed with the polyarylenesulfide-type resin and at least one resin selected from the group consisting of a polycarbonate-type resin, polyphenyleneether-type resin and an ABS-type resin.

Otherwise, the graft copolymer as compatibilizer according to the invention can be obtained by kneading the graft copolymer precursor under melting at 100° to 300° C. Alternatively, the epoxy group-containing olefin copolymer or the vinyl-type polymer or copolymer may be mixed with the graft copolymer precursor, and the resulting mixture may be kneaded under melting to obtain the graft copolymer.

The graft copolymer can be most conveniently obtained by kneading the graft copolymer precursor.

The amount of epoxy group-containing olefin copolymer to be freshly mixed with the graft copolymer precursor is up to 400 parts by weight based on 100 parts by weight of the precursor, with the preferred amount being up to 100 parts by weight. The amount of vinyl-type (co)polymer to be freshly mixed with the graft copolymer precursor is up to 400 parts by weight based on 100 parts by weight of the precursor, with the preferred amount being up to 100 parts by weight. The total amount of epoxy group-containing olefin copolymer and vinyl-type (co)polymer to be freshly mixed with the graft copolymer precursor is up to 400 parts by weight based on 100 parts by weight of the precursor.

The above-described radical polymerizable or copolymerizable organic peroxides are compounds represented by the general formula (10) or (11):

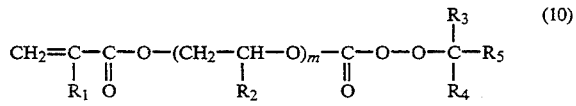

[wherein $R_1$ is a hydrogen atom or an alkyl group having 1 or 2 carbon atoms, $R_2$ is a hydrogen atom or a methyl group, each of $R_3$, $R_4$ is an alkyl group having 1 to 4 carbon atoms, and $R_5$ is an alkyl group having 1 to 12 carbon atoms, a phenyl group, an alkyl-substituted phenyl group or a cycloalkyl group having 3 to 12 carbon atoms; m is 1 or 2]

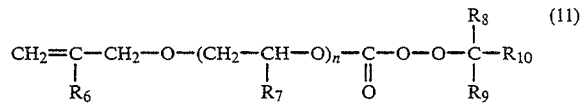

[wherein $R_6$ is a hydrogen atom or an alkyl group having 1 to 4 carbon atoms, $R_7$ is a hydrogen atom or a methyl group, each of $R_8$, $R_9$ is an alkyl group having 1 to 4 carbon atoms, and $R_{10}$ is an alkyl group having 1 to 12 carbon atoms, a phenyl group, an alkyl-substituted phenyl group or a cycloalkyl group having 3 to 12 carbon atoms; n is 0, 1 or 2]

Typical examples of the radical polymerizable or copolymerizable organic peroxides represented by the general formula (10) include t-butylperoxyacryloyloxyethyl carbonate; t-amylperoxyacryloyloxyethyl carbonate; t-hexylperoxyacryloyloxyethyl carbonate; 1,1,3,3-tetramethylbutylperoxyacryloyloxyethyl carbonate; cumylperoxyacryloyloxyethyl carbonate; p-isopropylcumylperoxyacryloyloxyethyl carbonate; t-butylperoxymethacryloyloxyethyl carbonate; t-amylperoxymethacryloyloxyethyl carbonate; t-hexylperoxymethacryloyloxyethyl carbonate; 1,1,3,3-tetramethylbutylperoxymethacryloyloxyethyl carbonate; cumylperoxymethacryloyloxyethyl carbonate; t-isopropylcumylperoxymethacryloyloxyethyl carbonate; t-butylperoxymethacryloyloxyethoxyethyl carbonate; t-amylperoxyacryloyloxyethoxyethyl carbonate; t-hexylperoxyacryloyloxyethoxyethyl carbonate; 1,1,3,3-tetramethylbutylperoxyacryloyloxyethoxyethyl carbonate; cumylperoxyacryloyloxyethoxyethyl carbonate; p-isopropylcumylperoxyacryloyloxyethoxyethyl carbonate; t-butylperoxymethacryloyloxyethoxyethyl carbonate; t-amylperoxymethacryloyloxyethoxyethyl carbonate; t-hexylperoxymethacryloyloxyethoxyethyl carbonate; 1,1,3,3-tetramethylbutylperoxymethacryloyloxyethoxyethyl carbonate; cumylperoxymethacryloyloxyethoxyethyl carbonate; p-isopropylcumylperoxymethacryloyloxyethoxyethyl carbonate; t-butylperoxyacryloyloxyisopropyl carbonate; t-amylperoxyacryloyloxy isopropyl carbonate; t-hexylperoxyacryloyloxyisopropyl carbonate; 1,1,3,3-tetramethylbutylperoxyacryloyloxyisopropyl carbonate; cumylperoxyacryloyloxyisopropyl carbonate; p-isopropylcumylperoxyacryloyloxyisopropyl carbonate; t-butylperoxymethacryloyloxyisopropyl carbonate; t-amylperoxymethacryloyloxyisopropyl carbonate; t-hexylperoxymethacryloyloxyisopropyl carbonate; 1,1,3,3-tetramethylbutylperoxymethacryloyloxyisopropyl carbonate; cumylperoxymethacryloyloxyisopropyl carbonate; p-isopropylcumylperoxymethacryloyloxyisopropyl carbonate.

Typical examples of the compounds represented by the general formula (11) include t-butylperoxyallyl carbonate; t-amylperoxyallyl carbonate, t-hexylperoxyallyl carbonate; 1,1,3,3-tetramethylbutylperoxyallyl carbonate; p-menthaneperoxyallyl carbonate; cumylperoxyallyl carbonate, t-butylperoxymethallyl carbonate; t-amylperoxymethallyl carbonate; t-hexylperoxymethallyl carbonate; 1,1,3,3-tetramethylbutylperoxymethallyl carbonate; p-menthaneperoxymethallyl carbonate, cumylperoxymethallyl carbonate; t-butylperoxyallyloxyethyl carbonate; t-amylperoxyallyloxyethyl carbonate; t-hexylperoxyallyloxyethyl carbonate; t-butylperoxymethallyloxyethyl carbonate; t-amylperoxymethallyloxyethyl carbonate; t-hexylperoxymethallyloxyethyl carbonate; t-butylperoxyallyloxyisopropyl carbonate; t-amylperoxyallyloxyisopropyl carbonate; t-hexylperoxyallyloxyisopropyl carbonate; t-butylperoxymethallyloxyisopropyl carbonate; t-amylperoxymethallyloxyisopropyl carbonate; t-hexylperoxymethallyloxyisopropyl carbonate.

Of these compounds, preferable ones are t-butylperoxyacryloyloxyethyl carbonate, t-butylperoxymethacryloyloxyethyl carbonate, t-butylperoxyallyl carbonate and t-butylperoxymethallyl carbonate.

When the compatibilizer (III) is incorporated, an inorganic filler can be also used in an amount of up to 150 parts by weight based on 100 parts by weight of the components (I)+(II)+(III).

The inorganic filler may be used in granular, lameliar, scaly, needle, spherical, balloon or fibrous forms, and examples of these inorganic fillers include granular fillers such as calcium sulfate, calcium silicate, clay, diatomaceous earth, talc, alumina, siliceous sand, glass powder, iron oxide, metallic powder, graphite, silicon carbide, silicon nitride, silica, boron nitride, aluminum nitride and carbon black; lamellar and scaly fillers such as mica, glass plate, sericite, pyrophyllite, metallic foil, such as aluminum flake, and graphite; balloon fillers such as Shirasu balloon, metallic balloon, glass balloon and pumice; and mineral fibers such as glass fiber, carbon fiber, graphite fiber, whisker, metallic fiber, silicon carbide fiber, asbestos and wollastonite.

When the content of filler is in excess of 150 parts by weight, the impact strength of molded articles deteriorates.

The surface of the inorganic filler is preferably treated by use of stearic acid, oleic acid, palmitic acid or a metallic salt thereof, paraffin wax, polyethylene wax or a modified material thereof, an organic silane, an organic borane or an organic titanate.

The thermoplastic resin composition according to the present invention may be prepared by melting and mixing the above-described resin (I), resin (II) and (III) at a temperature of 180° to 350° C., preferably 180° to 330° C.

When the temperature is 150° C. or lower, melting is incomplete, viscosity is high and mixing is insufficient resulting in a phase separation and delamination of molded articles unpreferably. When the temperature is 350° C. or higher, the resins to be blended decompose or a, gelation occurs.

In melting and mixing, there may be employed a conventional kneader such as a Banbury mixer, a kneader mixer, a kneading extruder, a biaxial extruder and mixing rolls.

In the thermoplastic resin composition according to the invention, various additives may also employed, in so far as they do not deviate from the gist of the present invention.

Examples of such usable additives include an inorganic flame retardant such as magnesium hydroxide or aluminum hydroxide; an organic flame retardant such as halogen or phosphorus-type flame retardants; an organic filler such as sawdust; an antioxidant; an ultraviolet inhibitor; a slip agent; a diapersant; a coupling agent; a foaming agent; a crosslinking agent, a colorant; an elastomer such as EPR, EPDM, SBS, SEBS; an engineering plastic such as polyolefin-type, aromatic polyester-type, polyamide-type resins; a vinyl-type resin such as rS, and PMMA.

Now, the thermoplastic resin composition according to the present invention will be described in detail in reference to Examples, which by no means limit the invention.

REFERENCE EXAMPLE 1

(Preparation of Compatibilizer IIIA)

In a 5-liter stainless steel autoclave was placed 2,500 g of pure water, and 2.5 g of polyvinyl alcohol was dissolved therein as a suspending agent. In the solution was placed 700 g of ethylene-glycidyl methacrylate copolymer as an epoxy group-containing olefin copolymer (glycidyl methacrylate content is 15% by weight) (trade name Rexpearl RA-3150; a product of Nippon Petrochemicals Co., Ltd.), followed by stirring to suspend the copolymer therein in an atmosphere of nitrogen. Separately, in 300 g of styrene as a vinyl monomer were dissolved 1.5 g of benzoylperoxide as a radical polymerization initiator (trade name Nyper-B; made by Nippon Oils & Fats Co., Ltd.) and 6 g of t-butylperoxymethacryloyloxyethyl carbonate as a radical polymerizable organic peroxide, and the resulting solution was then placed in the above-described autoclave, followed by stirring.

Afterward, the autoclave was heated up to a temperature of 60° to 65° C., and stirring was then continued for 2 hours, so that the epoxy group-containing olefin copolymer was impregnated with the vinyl monomer containing the radical polymerization initiator and the radical polymerizable organic peroxide. After it had been confirmed that the total amount of the impregnated vinyl monomer, radical polymerizable organic peroxide and radical polymerization initiator was 50% by weight or more of the original total weight thereof, the temperature of the mixture was raised to 80° to 85° C., and this temperature was then maintained for 7 hours to complete polymerization, followed by water washing and drying, thereby obtaining a graft copolymer precursor (IIIa) as compatibilizer. The styrene polymer in the graft copolymer precursor (Ilia) was extracted with ethyl acetate, and according to measurement by use of GPC, the number average polymerization degree of the styrene polymer i n said precursor (IIIa) was 900.

Next, this graft copolymer precursor was extruded at 200° C. by a plastomill monoaxial extruder (Toyo Seiki Seisaku-sho Ltd.) to perform a graft reaction, thereby obtaining a graft copolymer (ILIA) as compatibilizer. This compatibilizer was then observed by a scanning-type electron microscope (trade name JEOL JSM T300; made by JEOL, Ltd.), and it was found that it was a multi-phase structure thermoplastic resin in which spherical styrene polymer particles each having a diameter of 0.3 to 0.4 μm were uniformly dispersed. In this case, the grafting efficiency of the styrene polymer was 77.1% by weight.

REFERENCE EXAMPLE 2

(Preparation of Compatibilizer IIIB)

The same procedure as in Reference Example 1 was repeated with the exception that 300 g of styrene as a vinyl monomer was replaced with a mixed monomer of 210 g of styrene with 90 g of acrylonitrile, and 1.5 g of benzoylperoxide was replaced with 3 g of di-3,9,5-trimethylhexanonylperoxide (trade name Pearloyl 355; a product of Nippon Oils and Fats Co., Ltd.), and 3.0 g α-methylstyrene dimer (trade name Nofmer MSD; a product of Nippon Oils and Fats Co., Ltd.) was used as a molecular weight regulator, thereby obtaining a graft copolymer precursor as compatibilizer (IIIb) and a graft copolymer (IIIB) as compatibilizer. The number average polymerization degree of the styrene-acrylonitrile copolymer was 1,200. The average diameter of the styrene-acrylonitrile copolymer dispersed in the compatibilizer (IIIB) was 0.3 to 0.4 μm.

REFERENCE EXAMPLE 3

(Preparation of Compatibilizer IIIc)

The graft copolymer precursor (IIIa) obtained in Reference Example 1 in an amount of 60 g and an ethylene-glycidyl methacrylate copolymer (glycidyl methacrylate content is 15% by weight) (trade name Rexpearl RA-3150; a product of Nippon Petrochemicals Co., Ltd.) in an amount of 20 g were dry blended with a styrene polymer (tradename Diarex HF-55; a product of Mitsubishi Monsanto-Kasei Co., Ltd.) in an amount of 20 g, and the resultant blend was extruded at 200° C. by a plastomill monoaxial extruder (Toyo Seiki Seisakusho Ltd.), thereby preparing a graft copolymer as compatibilizer (IIIC). The average particle diameter of the styrene polymer dispersed in the compatibilizer (IIIC) was 0.3 to 0.5 μm.

REFERENCE EXAMPLE 4

(Preparation of Compatibilizer IIID)

The graft copolymer precursor (IIia) obtained in Reference Example 1 in an amount of 30 g was melted and blended with a styrene polymer (trade name Diarex HF-55; a product of Mitsubishi Monsanto-Kasei Co., Ltd.) in an amount of 70 g, and extruded at 200° C. by a plastomill monoaxial extruder, thereby preparing a graft copolymer as compatibilizer (IIID). The average particle diameter of the ethylene-glycidyl methacrylate copolymer dispersed in the compatibilizer (IIID) was 0.4 to 0.7 μm.

REFERENCE EXAMPLE 5

(Preparation of Compatibilizer IIIE)

The same procedure as in Reference Example 1 was repeated with the exception that 300 g of the styrene monomer as a vinyl monomer was replaced with 300 g of methyl methacrylate monomer, and 1.5 g of n-dodecyl mercaptan was used, thereby preparing a graft copolymer as compatibilizer (IIIE).

The average polymerization degree of the methyl methacrylate polymer was 700 and the average particle diameter of the methyl methacrylate polymer dispersed in the compatibilizer (IIID) was 0.2 to 0.4 μm.

EXAMPLES 1 to 8

Polyphenylenesulfide resin (I) (trade name Fortron KPS; a product of Kureha Chemical Co., Ltd.) (referred to as PPS in Tables), polyphenyleneether resin (IIA) (trade name Noryl 534 J-S01; a product of Nippon G.E. Plastic Co., Ltd.) (referred to as PPE in Tables) and the compatibilizers (IIIA), (IIIC), (IIID) or (IIIE) obtained in aforesaid Reference Examples were melted and blended together, then fed to an one-direction rotating biaxial extruder having a screw diameter of 30 mm. Afterward, the mixture was extruded and formed into pellets. The formed pelleted resin was dried in an atmosphere of 150° C. for 3 hours. Next, specimens were prepared therefrom by an injection molding machine. Sizes of the specimens were as follows:

Specimens for notched izod Impact Strength
13×65×6 mm
Specimens for Deflection Temperature under Load
13×130×6 mm
Specimens for Bending Test
10×130×4 mm Test procedures were as follows:
(1) Notched izod impact strength
JIS K7110
(2) Heat deflection temperature under load
JIS K7207
(3) Bending test
JIS K6758
(4) Appearance of molded articles Appearance of molded articles was ranked as follows by visually observing flow mark and luster.
(a) Presence of flow mark
⊚: Flow markwas not present at all.
: Flow marks were slightly present.
X: Flow marks were perceptibly present.
(b) Evaluation of Gloss
⊚: Luster was extremely good.
: Luster was good.
X: Luster was bad.

TABLE 1

| Example | 1 | 2 | 3 | 4 | 5 | 6 | 7 | 8 |
|---|---|---|---|---|---|---|---|---|
| PPS (wt %) | 80 | 80 | 60 | 60 | 60 | 20 | 60 | 60 |
| PPE (wt %) | 20 | 20 | 40 | 40 | 40 | 80 | 40 | 40 |
| Compatibilizer Agent IIIA (parts by wt)[1)] | 5 | 10 | 10 | 20 | — | 10 | — | — |
| Compatibilizer Agent IIIC (parts by wt)[1)] | — | — | — | — | 20 | — | — | — |
| Compatibilizer Agent IIID (parts by wt)[1)] | — | — | — | — | — | — | 20 | — |
| Compatibilizer Agent IIIE (parts by wt)[1)] | — | — | — | — | — | — | — | 20 |
| Notched Izod Impact Strength (Kg-cm/cm) | 15 | 16 | 18 | 23 | 19 | 28 | 8 | 12 |
| Deflection Temp. under Load (18.6 Kg/cm$^2$) | 131 | 138 | 144 | 149 | 147 | 172 | 115 | 120 |
| Flexural Strength (Kg/cm$^2$) | 968 | 953 | 949 | 941 | 940 | 922 | 780 | 850 |
| Flexural Modulus × | 32.2 | 32.0 | 31.3 | 30.8 | 30.8 | 27.1 | 27.8 | 28.7 |

TABLE 1-continued

| Example | 1 | 2 | 3 | 4 | 5 | 6 | 7 | 8 |
|---|---|---|---|---|---|---|---|---|
| $10^{-3}$ (Kg/cm$^2$) | | | | | | | | |
| Flow Mark | ⊚ | ⊚ | ⊚ | ⊚ | ⊚ | ⊚ | ○ | ⊚ |
| Gloss | ⊚ | ⊚ | ⊚ | ⊚ | ⊚ | ⊚ | ⊚ | ⊚ |

[1] Parts by wt. based on 100 parts by wt. of (PPS + PPE)

EXAMPLES 9 to 14

The compatibilizer precursor (IIIa) obtained in Reference Example 1, or SEBS (trade name Grayton G1650; a product of Shell Chemical Co., Ltd.) and glass fiber (an average fiber length of 0.3 mm and an average diameter of 10 μm) as an inorganic filler were used. Table 2 gives the results.

REFERENCE EXAMPLES 1 to 7

Compatibilizer (ILIA) was replaced with an epoxy group-containing olefin copolymer (trade name Rexpearl RA-3150; a product of Nippon Petrochemicals Co., Ltd.) or an ethylene-glycidylmethacrylate copolymer (95/5). Table 3 gives the results.

TABLE 2

| Example | 9 | 10 | 11 | 12 | 13 | 14 |
|---|---|---|---|---|---|---|
| PPS (wt %) | 80 | 80 | 60 | 60 | 60 | 20 |
| PPE (wt %) | 20 | 20 | 40 | 40 | 40 | 80 |
| Compatibilizer Agent IIIA (parts by wt)[1] | 10 | 10 | — | 10 | 10 | — |
| Compatibilizer Agent IIIa (parts by wt)[1] | — | — | 10 | — | — | 10 |
| Crayton G 1650 (parts by wt)[1] | — | 10 | — | 10 | 10 | 10 |
| Glass Fiber (parts by wt)[2] | 30 | 30 | — | — | 30 | 30 |
| Notched Izod Impact Strength (Kg-cm/cm) | 14 | 22 | 17 | 34 | 30 | 29 |
| Deflection Temp. under Load (18.6 Kg/cm$^2$) | 250 | 247 | 142 | 143 | 239 | 149 |
| Flexural Strength (Kg/cm$^2$) | 2230 | 2190 | 933 | 930 | 1980 | 1530 |
| Flexural Modulus × $10^{-3}$ (Kg/cm$^2$) | 97.5 | 92.0 | 31.0 | 30.3 | 89.6 | 79.0 |
| Flow Mark | ⊚ | ⊚ | ⊚ | ⊚ | ⊚ | ⊚ |
| Gloss | ⊚ | ⊚ | ⊚ | ⊚ | ⊚ | ⊚ |

[1] Parts by wt. based on 100 parts by wt. of PPS + PPE
[2] Parts by wt. based on 100 parts by wt. of resin components

TABLE 3

| Comp. Example | 1 | 2 | 3 | 4 | 5 | 6 | 7 |
|---|---|---|---|---|---|---|---|
| PPS (wt %) | 100 | 60 | 60 | 60 | 60 | 60 | 60 |
| PPE (wt %) | — | 40 | 40 | 40 | 40 | 40 | 40 |
| Rexpearl RA 3150 (parts by wt)[1] | — | — | 20 | — | 10 | 10 | 10 |
| Styrene-Glycidyl Methacrylate Copolymer (parts by wt)[1] | — | — | — | 20 | 10 | — | — |
| Crayton G 1650 (parts by wt)[1] | — | — | — | — | — | 10 | 10 |
| Glass Fiber (parts by wt)[2] | — | — | — | — | — | — | 30 |
| Notched Izod Impact Strength (Kg-cm/cm) | 2.0 | 1.6 | 3.6 | 2.5 | 3.5 | 3.6 | 2.9 |
| Deflection Temp. under Load (18.6 Kg/cm$^2$) | 130 | 93 | 95 | 99 | 98 | 91 | 127 |
| Flexural Strength (Kg/cm$^2$) | 970 | 635 | 663 | 692 | 680 | 590 | 1060 |
| Flexural Modulus × $10^{-3}$ (Kg/cm$^2$) | 37.0 | 23.7 | 21.2 | 22.8 | 22.0 | 20.9 | 58.0 |
| Flow Mark | ⊚ | X | X | ○ | X | X | X |
| Gloss | ⊚ | X | ○ | ○ | X | X | X |

[1] Parts by wt. based on 100 parts by wt. of PPS + PPE
[2] Parts by wt. based on 100 parts by wt. of resin components

EXAMPLES 15 to 24

The same procedure as in Examples 1 to 12 was repeated with the exception that the PPE was replaced with a polycarbonate-type resin (IIB) (trade name Panlight L-1250; a product of Teijin-Kasei Co., Ltd.) (referred to as PC in Tables) or with an ABS-type resin (IIC) (trade name Styrac ABS 283; a product of Asahi Chemical Co., Ltd.) (referred to as ABS in Tables). Further, the compatibilizer (IIIA) or (IIIC) was replaced with the compatibilizer (IIIB). Table 4 gives the results.

olefin copolymer or an acrylonitrile-styrene copolymer (trade name Denka AS AS-S-312; a product of Denki Kagaku-Kogyo Co., Ltd.). The results are shown in Table 5.

TABLE 5

| Comp. Example | 8 | 9 | 10 | 11 | 12 | 13 | 14 |
|---|---|---|---|---|---|---|---|
| PPS (wt %) | 60 | 60 | 60 | 60 | 60 | 60 | 60 |
| PC (wt %) | 40 | — | 40 | 40 | 40 | 40 | — |
| ABS (wt %) | — | 40 | — | — | — | — | 40 |
| Rexpearl RA 3150 (parts by wt)[1] | — | — | 10 | — | 10 | 10 | — |
| Acrylonitrile-Styrene Copolymer (parts by wt)[1] | — | — | — | 10 | 10 | — | 10 |
| Crayton G 1650 (parts by wt)[1] | — | — | — | 10 | — | 10 | 10 |
| Glass Fiber (parts by wt)[2] | — | — | — | — | — | 30 | — |
| Notched Izod Impact Strength (Kg-cm/cm) | 1.8 | 1.7 | 2.4 | 1.7 | 3.6 | 3.0 | 3.2 |
| Deflection Temp. under Load (18.6 Kg/cm$^2$) | 89 | 84 | 98 | 83 | 92 | 124 | 81 |
| Flexural Strength (Kg/cm$^2$) | 620 | 615 | 686 | 697 | 673 | 996 | 594 |
| Flexural Modulus × 10$^{-3}$ (Kg/cm$^2$) | 21.9 | 20.4 | 22.0 | 23.0 | 21.4 | 56.5 | 19.1 |
| Flow Mark | X | X | ○ | X | ○ | X | X |
| Gloss | X | X | X | X | ○ | X | X |

[1]Parts by wt. based on 100 parts by wt. of PPS + PPE
[2]Parts by wt. based on 100 parts by wt. of resin components As evidenced by the above description and Examples, it should be apparent that when blending a polyarylenesulfide-type resin (I) with at least one resin (II) selected from the group consisting of polycarbonate-type resins, polyphenyleneether-type resins and ABS-type resins, the use of the compatibilizer according to the present invention provides several advantages.

That is, in comparison with the composition as in

TABLE 4

| Example | 15 | 16 | 17 | 18 | 19 | 20 | 21 | 22 | 23 | 24 | 25 | 26 |
|---|---|---|---|---|---|---|---|---|---|---|---|---|
| PPS (wt %) | 80 | 80 | 60 | 60 | 60 | 60 | 60 | 60 | 60 | 20 | 60 | 60 |
| PC (wt %) | 20 | — | 40 | 40 | 40 | 40 | 40 | — | — | 80 | 40 | 40 |
| ABS (wt %)[1] | — | 20 | — | — | — | — | — | 40 | 40 | — | — | — |
| IIIB[1] (*) | 10 | 10 | 10 | — | — | 10 | 10 | 10 | 10 | 10 | — | — |
| IIIb[1] (*) | — | — | — | 10 | — | — | — | — | — | — | — | — |
| IIIC[1] (*) | — | — | — | — | 10 | — | — | — | — | — | — | — |
| IIID[1] (*) | — | — | — | — | — | — | — | — | — | — | 10 | — |
| IIIE[1] (*) | — | — | — | — | — | — | — | — | — | — | — | 10 |
| Crayton G1650[1] | 10 | — | — | — | 10 | 10 | 10 | — | 10 | 10 | 10 | — |
| Glass Fiber[2] | 30 | 30 | — | — | — | — | 30 | — | 30 | — | — | — |
| Impact Strength[3] | 28 | 24 | 21 | 20 | 38 | 36 | 33 | 35 | 31 | 40 | 28 | 13 |
| Deflection Temp.[4] | 242 | 238 | 142 | 140 | 140 | 130 | 237 | 138 | 235 | 135 | 112 | 125 |
| Flexural Strength (Kg/cm$^2$) | 2160 | 2020 | 950 | 948 | 921 | 926 | 1940 | 892 | 1970 | 885 | 760 | 880 |
| Flexural Modulus × 10$^{-3}$ (Kg/cm$^2$) | 90.3 | 90.0 | 31.0 | 31.0 | 30.5 | 30.9 | 87.2 | 29.7 | 89.5 | 28.3 | 26.4 | 29.0 |
| Flow Mark | ⊚ | ⊚ | ⊚ | ⊚ | ⊚ | ⊚ | ⊚ | ⊚ | ⊚ | ⊚ | ⊚ | ⊚ |
| Gloss | ⊚ | ⊚ | ⊚ | ⊚ | ⊚ | ⊚ | ⊚ | ⊚ | ⊚ | ⊚ | ⊚ | ⊚ |

[1]Parts by wt. based on 100 parts by wt. of PPS + PPE
[2]Parts by wt. based on 100 parts by wt. of resin components
[3]Notched Izod (Kg-cm/cm)
[4](°C.) 18.6 Kg/cm$^2$
(*) Compatibilizer

REFERENCE EXAMPLES 8 to 14

The same procedure as in Examples 13 to 22 was repeated with the exception that the compatibilizer (IIIB) was replaced with an epoxy group-containing Reference Examples, the thermoplastic resin compositions of the present invention have an improved impact resistance while stiffness and heat resistance of the resins to be blended are retained.

The thermoplastic resin composition containing the compatibilizer (III) of the present invention has a feature of each of the blended resins of a polyarylenesulfide-type resin (I) and at least one resin selected from the group consisting of polycarbonate-type resins, polyphenyleneether-type resins and ABS-type resins, such as good impact and heat resistance, moldability, and appearance of molded articles.

It is widely used for the manufacture of automobile parts, electrical and electronic components, industrial parts, and the like.

What is claimed is:

1. A thermoplastic resin composition comprising
   60 to 80% by weight of a polyarylenesulfide resin (I),
   20 to 40% by weight of at least one resin (II) selected from the group consisting of polycarbonate resins and ABS resins (II), and
   0.1 to 100 parts by weight, on the basis of 100 parts by weight of the aforesaid resins (I)+(II), of a graft copolymer as compatibilizer (III) for the resins (I) and (II), said compatibilizer having a multi-phase structure and composed of 5 to 95% by weight of an epoxy group-containing olefin copolymer selected from the group consisting of ethylene-glycidyl(metha)acrylate copolymers and ethylene-glycidyl(metha)acrylate-(metha)acrylic acid alkyl ester copolymers, and 95 to 5% by weight of a vinyl (co)polymer having a polymerization degree of 5 to 10,000 and which is a styrene homopolymer or a styrene-acrylonitrile copolymer containing 50% by weight or more of styrene unit, one of the (co)polymer components of the graft copolymer being in the form of a dispersion phase having a particle diameter of 0.001 to 10 μm.

2. A thermoplastic resin composition in accordance with claim 1, wherein the compatibilizer (III) is a graft copolymer composed of
   30 to 90% by weight of epoxy group-containing olefin copolymer, and
   70 to 10% by weight of vinyl (co)polymer, the vinyl (co)polymer component of the graft copolymer being in the form of a dispersion phase having a particle diameter of 0.001 to 10 μm in the epoxy group-containing olefin copolymer phase.

3. A thermoplastic resin composition in accordance with claim 1, wherein the compatibilizer (III) is a graft copolymer of the epoxy group-containing olefin copolymer and the vinyl (co)polymer wherein the graft copolymer is the product of melting and mixing a graft copolymer precursor which is prepared previously by copolymerization of at least one vinyl monomer with at least one radical polymerizable organic peroxide in an epoxy group-containing olefin copolymer phase, the organic peroxide being represented by the following formula (10) or (11):

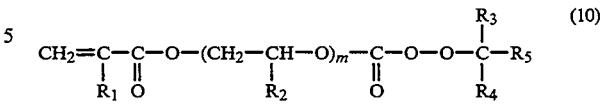

wherein $R_1$ is a hydrogen atom or an alkyl group having 1 or 2 carbon atoms, $R_2$ is a hydrogen atom or a methyl group, each of $R_3$, and $R_4$ is an alkyl group having 1 to 4 carbon atoms, and $R_5$ is an alkyl group having 1 to 12 carbon atoms, a phenyl group, an alkyl-substituted phenyl group or a cycloalkyl group having 3 to 12 carbon atoms, m is 1 or 2;

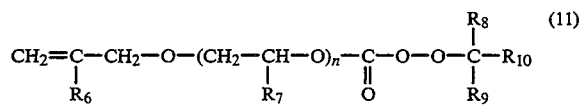

wherein $R_6$ is a hydrogen atom or an alkyl group having 1 to 4 carbon atoms, $R_7$ is a hydrogen atom or a methyl group, each of $R_8$, and $R_9$ is an alkyl group having 1 to 4 carbon atoms, and $R_{10}$ is an alkyl group having 1 to 12 carbon atoms, a phenyl group, an akyl-substituted phenyl group or a cycloalkyl group having 3 to 12 carbon atoms, n is 0, 1 or 2.

4. A thermoplastic resin composition in accordance with claim 1, wherein the compatibilizer (III) is a graft copolymer product of melting and mixing said graft copolymer precursor with a fresh epoxy group-containing olefin copolymer.

5. A thermoplastic resin composition in accordance with claim 1, wherein the compatibilizer (III) is a graft copolymer product of melting and mixing said graft copolymer with a fresh vinyl (co)polymer.

6. A thermoplastic resin composition in accordance with claim 1, wherein the compatibilizer (III) is a graft copolymer product of melting and mixing said graft copolymer with a fresh epoxy group-containing olefin copolymer and a fresh vinyl (co)polymer.

7. A thermoplastic resin composition in accordance with claim 1, wherein the epoxy group-containing olefin copolymer is composed of 60 to 95% by weight of ethylene unit, 0.5 to 40% by weight of glycidyl (metha)acrylate unit, and 0 to 39.5% by weight of (metha)acrylic acid alkyl ester unit.

8. A thermoplastic resin composition in accordance with claim 1 consisting essentially of resin (I), resin (II) and compatibilizer (III).

9. A thermoplastic resin composition in accordance with claim 1 consisting of essentially resin (I), resin (II) and compatibilizer (III).

* * * * *